Oct. 28, 1930.  J. B. DAVIS  1,779,904
LIQUID DISPENSING APPARATUS
Filed Jan. 2, 1929  5 Sheets-Sheet 2
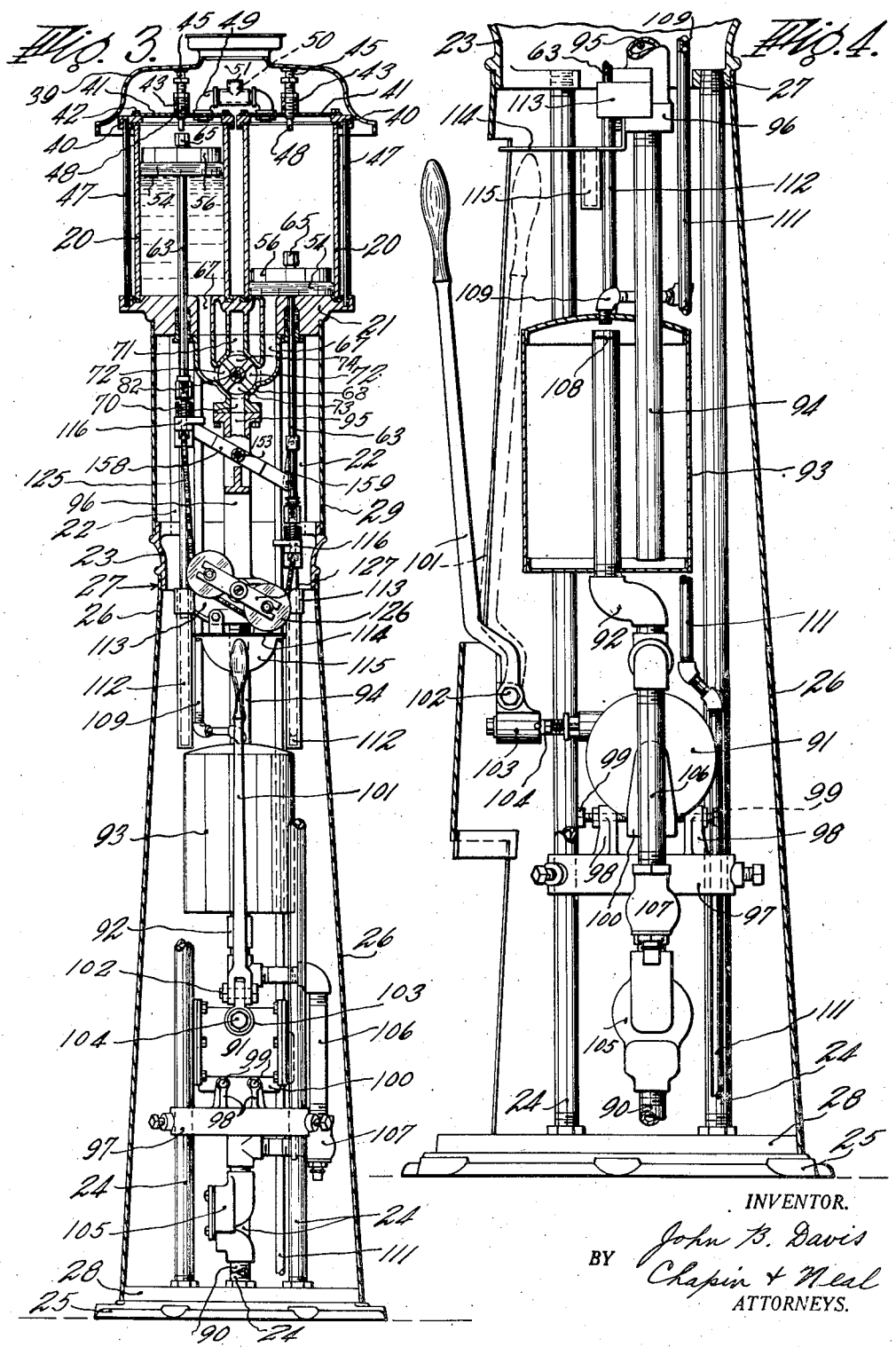
INVENTOR.
John B. Davis
BY Chapin & Neal
ATTORNEYS.

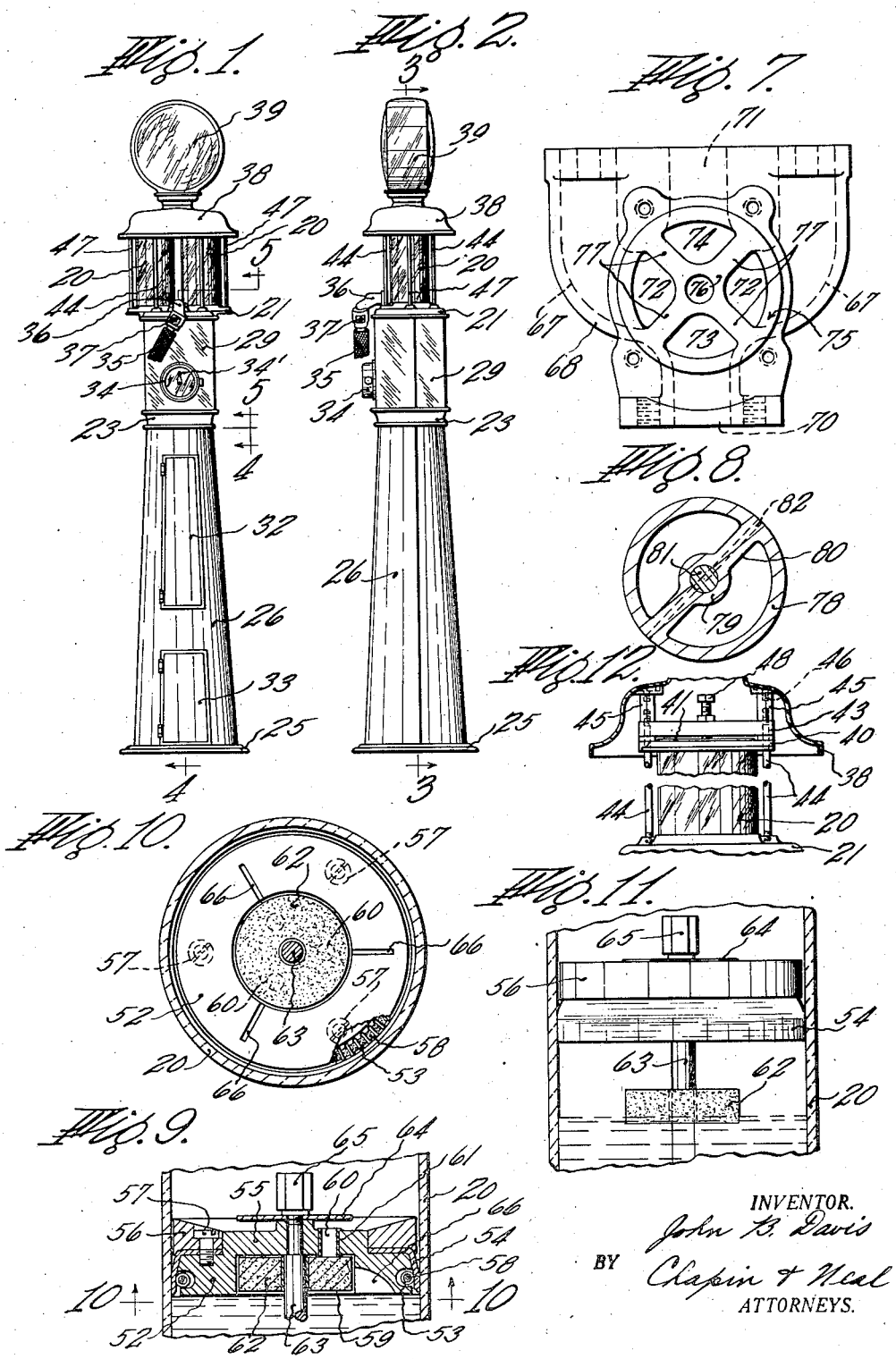

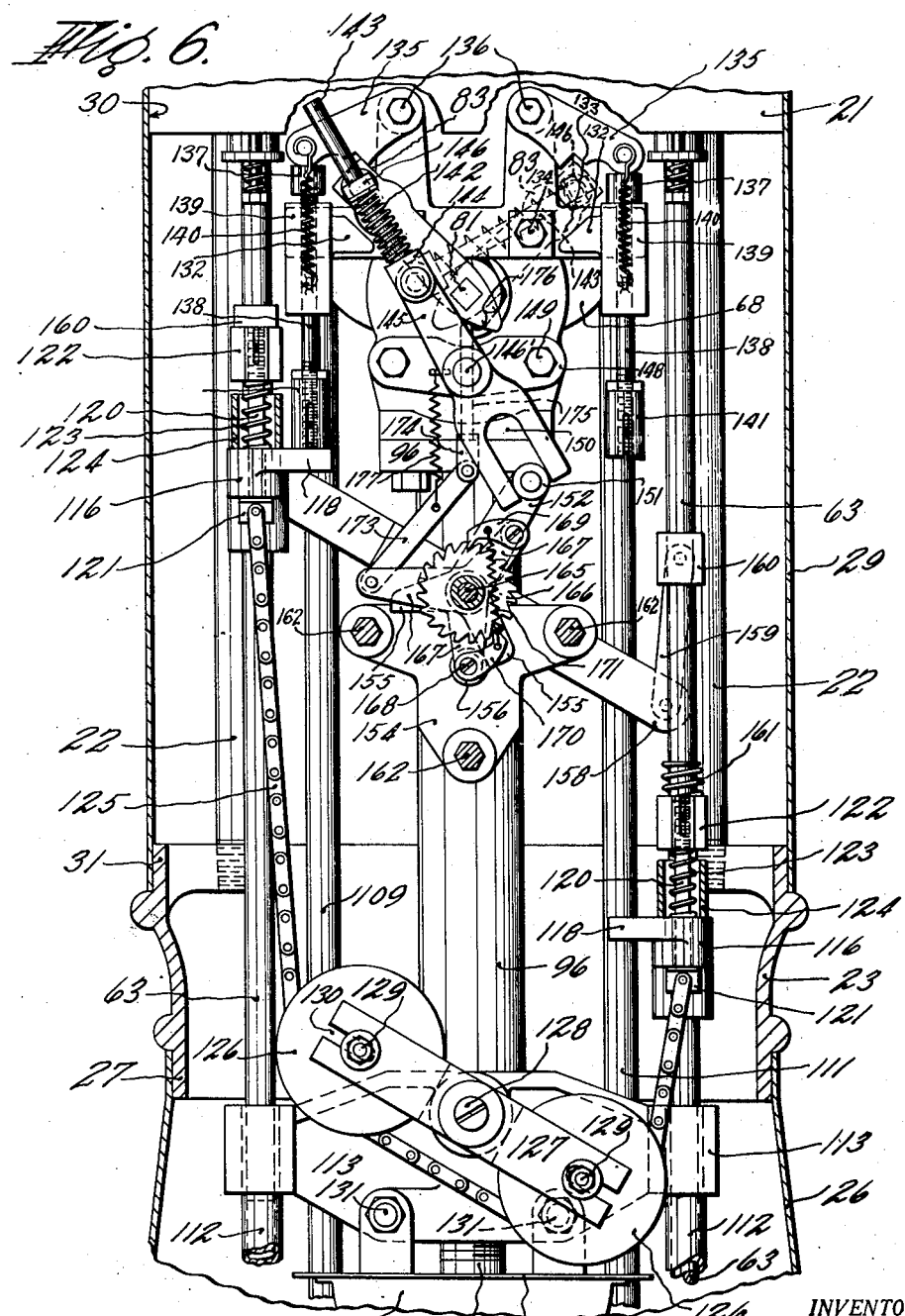

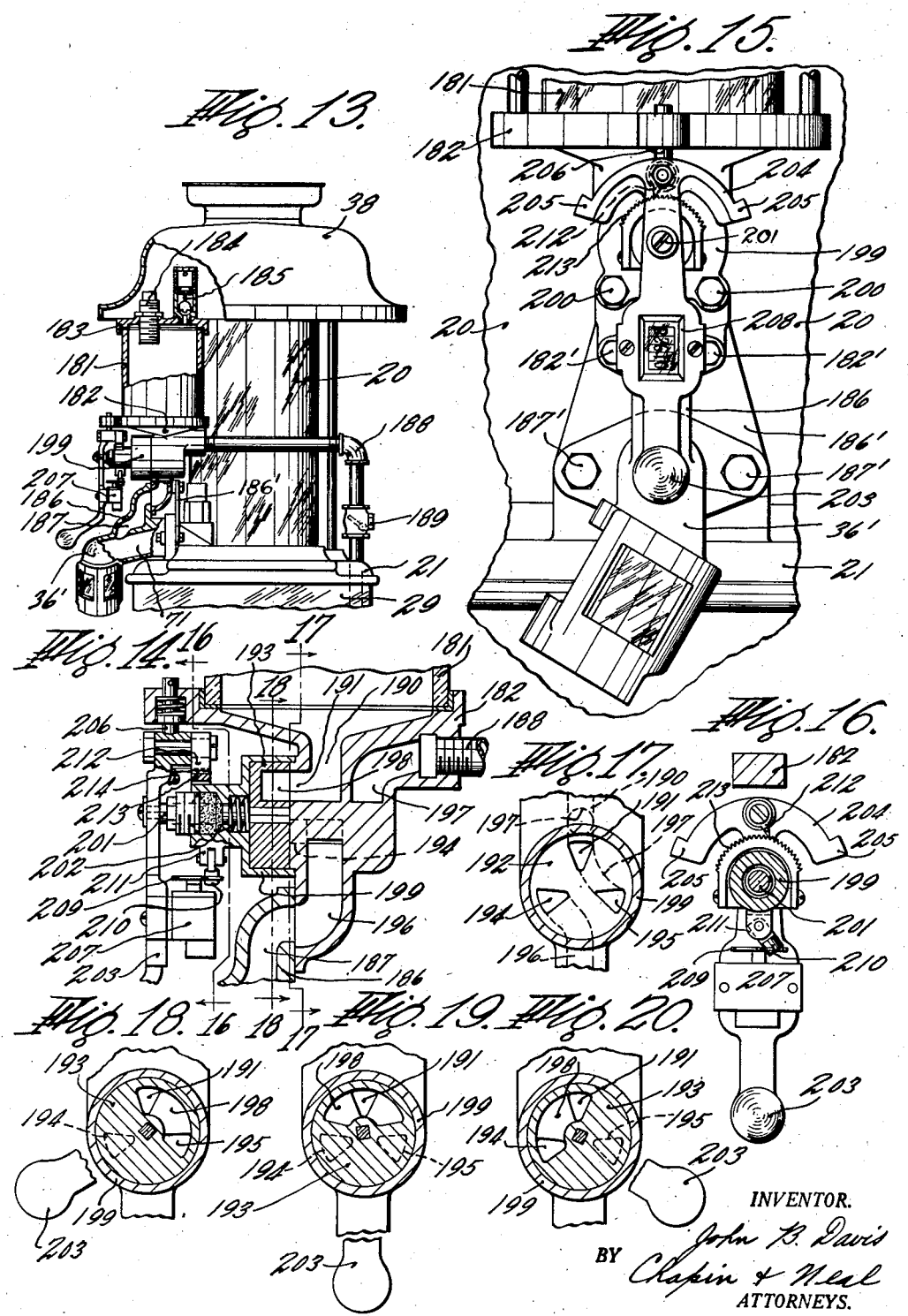

Patented Oct. 28, 1930

1,779,904

UNITED STATES PATENT OFFICE

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS

LIQUID-DISPENSING APPARATUS

Application filed January 2, 1929. Serial No. 329,743.

This invention relates to improvements in liquid dispensing apparatus of a type suitable for use in dispensing gasoline, oils and the like.

The invention, for a full utilization of all its features, is embodied in a so-called twin cylinder dispenser of the visible measuring type, although certain features as will be hereinafter pointed out, are or may be, independent of the twin cylinder arrangement. The use of a pair of measuring cylinders is, however, preferred because one can be filled while the other is discharging. The two measuring cylinders are alternately supplied with liquid under pressure by any suitable means, such as a pump, and the emptying and filling of the cylinders is controlled by a valve which works automatically at the proper times. The attendant simply has to pump or control the pumping and everything else takes place automatically. That is, the liquid is measured within the view of the customer and delivered in substantially an unbroken stream so long as pumping is continued.

This general class of dispenser is to be found in various forms in the art and the present invention is directed to improvements which enable speedy and fool-proof operation of the apparatus with close accuracy of measurement of the liquid dispensed.

The invention is also an improvement on that disclosed in my copending application Serial No. 266,383, filed March 31, 1928.

The apparatus, in common with that of said prior application, includes a pair of measuring cylinders with a piston in each which will be raised by the incoming liquid as its cylinder is filled. These pistons are interconnected so that as one is raised the other is lowered and thereby forcibly discharges the liquid at a rapid rate. This arrangement is coupled with a quick acting valve mechanism, the movement of which is controlled and initiated by the position of the pistons in their cylinders, but which proceeds independently of any control by the piston after it has been initiated. The valve is moved practically instantaneously at the very end of each stroke of the piston. The measurement, by positive displacement of the liquid by a piston over a certain stroke, insures accuracy of measurement only when coupled with the valve which reverses almost instantaneously at the end of the piston's stroke. The positive expulsion of the liquid from a measuring cylinder gives speedy delivery and insures that one cylinder empties as fast as the other is filled.

Particular objects of this invention are to improve the mechanism which interconnects the pistons of the measuring cylinders, retaining the advantages incident to the mechanism used for the purpose in the prior application and overcoming certain disadvantages thereof; to improve the construction of the measuring cylinder pistons, particularly with respect to the valve controlled vents thereof; to provide for the separation of air from the gasoline before it is pumped into the measuring cylinders; to provide for the automatic draining of the measuring cylinders; and to generally improve the apparatus in other ways; all as will appear from the following description and be pointed out in the appended claims.

The invention will be disclosed with reference to the accompanying drawings, in which:—

Figs. 1 and 2 are exterior front and side elevational views of a dispensing apparatus embodying the invention;

Fig. 3 is a sectional elevational view drawn to a larger scale and taken on the line 3—3 of Fig. 2;

Figure 5:
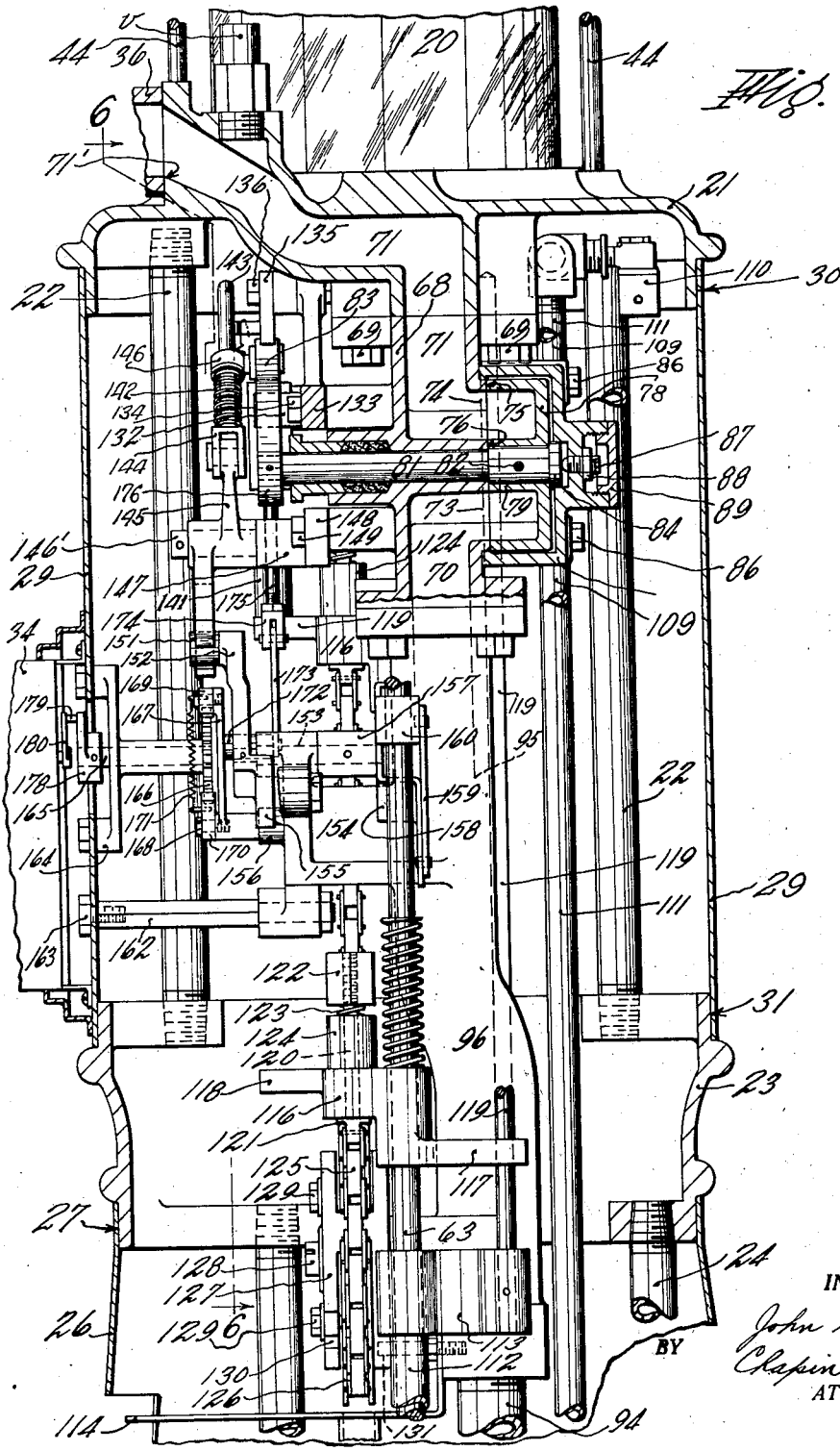

Figs. 4 and 5 are fragmentary cross sectional views, drawn to a still larger scale and taken on the lines 4—4 and 5—5, respectively, of Fig. 1;

Fig. 6 is a view taken on the line 6—6 of Fig. 5;

Fig. 7 is a detail view of the main valve body showing its passages and ports;

Fig. 8 is a sectional view of the valve which cooperates with said body;

Fig. 9 is a sectional view showing one of the pistons in its measuring cylinder;

Fig. 10 is a sectional plan view taken on the line 10—10 of Fig. 9;

Fig. 11 is a fragmentary sectional view of one of the measuring cylinders illustrative of the action of the float air valve associated with the piston of such cylinder;

Fig. 12 is a fragmentary cross sectional view illustrative of the construction at the upper ends of the measuring cylinders;

Fig. 13 is a fragmentary cross sectional view showing the attachment for dispensing smaller unit quantities than those dispensed by the measuring cylinders;

Fig. 14 is a fragmentary sectional view of the same drawn to a larger scale;

Fig. 15 is a fragmentary front elevational view of the attachment;

Fig. 16 is a sectional view taken on the line 16—16 of Fig. 14;

Fig. 17 is a sectional view taken on the line 17—17 of Fig. 14; and

Figs. 18, 19 and 20 are sectional views taken on the line 18—18 of Fig. 14 and showing the valve, respectively, in fill, neutral and discharge positions.

The dispensing apparatus includes two transparent measuring cylinders 20 (Figs. 1 and 3) which are mounted side by side on a base member 21 with their axes disposed vertically and in parallel relation. The base 21 is supported by four pipe columns 22 (Figs. 3 and 5) from a ring 23 and this member is supported by three pipe columns 24 (Figs. 3 and 4) from a base 25. The space between the ring 23 and base 25 is enclosed by a two part casing 26, of circular cross section, which is suitably fastened to circular flanges 27 and 28 on ring 23 and base 25, respectively. The space between member 21 and ring 23 is also enclosed by a two part casing 29 of square cross section suitably secured to flanges 30 and 31 formed on members 21 and 23, respectively. The casing 26 has doors 32 and 33 (Fig. 1), the former allowing access to the operating handle for the pump and the latter allowing access for connecting the pump to the underground supply tank (not shown). On the casing 29 is a suitable register 34. The dispensing hose 35 is attached by a fitting 36 having a sight glass 37 to member 21. The measuring cylinders 20 are surmounted by a dome 38 which may carry an illuminated globe 39.

Each of the measuring cylinders is surmounted by an annular ring 40 (Fig. 3). Resting on this ring is a disc 41 which closes the upper end of the cylinder and is secured to ring 40 by cap screws 42. Overlying disc 41 and extending diametrically across the same is a cross bar 43, the ends of which rest on ring 40 (Fig. 12). A pair of studs 44 extend one through each end of cross bar 43 and through ring 40 to base 21, into which they are threaded. Long, hexagonal nuts 45 are threaded on the upper ends of studs 44 and serve to clamp the cross bar 43 to ring 40 and the cylinder 20 between the latter and base 21. The dome 39 rests on the upper ends of nuts 45 and is secured thereto by cap screws 46. The rods 47 shown in Fig. 3 are dummy rods inserted for appearance's sake. Threaded centrally through cross car 43 is a screw 48 which extends through disc 41 and depends into the upper end of the measuring cylinder, forming an adjustable abutment. The upper ends of both cylinders 20 are interconnected by piping 49, secured as indicated to discs 41 and having a central passage 50, preferably screened as at 51, opening to the atmosphere.

As shown in Fig. 3, within each cylinder 20 is a piston. Each such piston comprises a body 52 (Figs. 9 and 10) which is circumferentially grooved to receive a spring 53. This spring is made up from a suitable length of close wound coil spring, the ends of which are brought together and suitably joined, thereby forming an annulus of appropriate inside diameter to fit in the aforesaid groove. Surrounding spring 53 is the cylindrical part of a cupped piston leather 54. The flat annular part of the leather rests upon the upper face of body 52 and the latter has a central upstanding cylindrical part 55 which passes upwardly through the opening in the leather. An annular ring 56 encompasses part 55, rests on top of the flat annular part of the piston leather and is secured to body 52 by screws 57 (Figs. 9 and 10). The spring 53, which is compressed to some extent when the piston is inserted in the cylinder, presses radially outward at many points on the cylindrical part of the piston leather 54 and tends to hold the same in close contact with the walls of the glass cylinder. Pressure of liquid beneath the piston also serves the same purpose. The construction is calculated to maintain a fluid tight joint between the piston and the glass cylinder, notwithstanding that the latter may be somewhat irregular and not exactly circular in form. The space within spring 53 is stuffed with packing 58 in order to exclude the volume of liquid which might otherwise enter this space and, under certain conditions, cause a discrepancy in measurement as will later appear.

The piston body 52 has in its lower face a central cylindrical recess 59 and leading upwardly therefrom through the body are three holes 60, each formed in a bushing 61 held in body 52 by heading over its upper and lower ends. The recess 59 and holes 60 afford passages through the piston for the purpose of permitting the escape of air from below the piston and for the purpose of venting that portion of the cylinder which lies below the piston. The flanged lower ends of the several bushings 61 afford valve seats, adapted to be engaged by a float 62 as a valve. The float valve is mounted to slide freely on the piston rod 63. The upper end of rod 63 is shouldered down to pass through body 52 and mounted thereon is a baffle plate 64, which overlies the upper ends of holes 60. A special nut 65 threaded on the upper end of rod 63 serves to clamp the baffle 64 to the piston body and the latter to rod 63. Liquid raises the float and the latter eventually closes the air passage after the air has been exhausted through vents 60. The float, when in position to close holes 60, substantially fills the recess 59. The upper face of member 56 is inwardly inclined forming with the corresponding face of body 52 a saucer-like receptacle, whereby occasional drops of liquid, which may at times pass through the vents 60 as air is being expelled, will drain back through these vents when they are subsequently opened. The baffle 64 deflects any liquid which may pass through holes 60 and confines it to the saucer-like receptacle. The lower face of member 52 is made perfectly flat and, to avoid trapping air beneath the piston, a series of grooves 66 are provided in said lower face which facilitate the outflow of air. These grooves, which may be increased in number if necessary or desired, radiate from recess 59. Each groove is very narrow (Fig. 10) and gradually increases in depth from a minimum at its outer end to a maximum at its inner end (Fig. 9).

The stroke of each piston 52 is positively limited,—on the upward stroke by the engagement of nut 65 with the lower end of the overlying stop screw 48 and on the downward stroke by the abutment of the flat lower face of the piston with the flat upper face of member 21, whereby all liquid between such faces is positively expelled from the cylinder, leaving only such small volumes of liquid as may occupy the spaces around spring 53, float 62 and in grooves 66. If the piston is allowed to dwell in its lower position, these small volumes of liquid, just referred to, will also drain out, because vent valve 62 will have time to open. Therefore, there may be a slight difference in measurement under the two conditions of operation. If the piston immediately reverses and starts upwardly the small volumes, referred to, will not be delivered, while if the piston dwells in its lower position such volumes will be delivered. This explains the reason for reducing these volumes to a minimum and in the present apparatus, they have been cut down to such a degree as to be well within the permissible tolerances of measurement.

Each cylinder 20 is closed at its lower end by member 21 except for a single passage 67 which serves both for the inflow and outflow of liquid (Fig. 3). These passages 67 are formed in part in member 21 and in part in a valve body 68, secured to member 21 by bolts 69 (Fig. 5). A supply passage 70 is formed in the valve body 68 and a discharge passage 71 is formed in part in said body and in part in member 21. As shown in Fig. 5, passage 71 leads upwardly from the valve body into member 21 and then turns forwardly and extends to the discharge fitting 36, above described. This passage is provided with the usual air vent valve to prevent siphoning of liquid from passage 71 below the level of weir 71'. The valve body and its valve are separately shown in Figs. 7 and 8 and the two are shown in working relation in Fig. 5. The valve seat is on the circular rear face of body 68 and the several passages 67, 70 and 71 terminate in ports 72, 73 and 74 respectively, leading to such face. These ports are spaced ninety degrees apart with the cylinder ports 72 diametrically opposed and the inlet port 73 diametrically opposed to the outlet port 74. The valve seat comprises an outer annular portion 75, a central inner portion 76 and connecting webs 77, all of which are located in the same plane. The valve is a cup shaped element 78, having a central hub 79 and a pair of diametrically opposed connecting webs 80. The end faces of hub 79 and the peripheral part of cup 78 are in the same plane and contact with the parts 76 and 75, respectively, of the valve seat while the webs 80 contact with one or the other of a pair of diametrically opposed webs 77. Assume that the valve, as shown in Fig. 8, is superposed on the valve body shown in Fig. 7 without any relative change in angular positions of the parts, liquid from passage 70 will pass through port 73 into the right hand half of cup 78 and thence through right hand port 72 into the right hand passage 67. At the same time, liquid from the left hand passage 67 can enter the left hand part of cup 78 through the left hand port 72 and pass out, by way of port 74, into discharge passage 71. Thus, one cylinder 20 can be filled while the other discharges. The valve, when positioned as described, permits the left hand cylinder 20 (as viewed in Fig. 3) to be filled and the right hand cylinder to be discharged (Figs. 3 and 7 are taken in opposite directions). The valve 78 is intermittently movable, by mechanism to be later described, through an angle of ninety degrees back and forth between two positions of rest, one of which has been described. To reach the other position, the valve is turned counter-clockwise as viewed in Figs. 7 and 8, or clockwise as viewed in Figs. 3 and 6, through an angle of ninety degrees. The right hand cylinder will then be connected to inlet passage 70 and the left hand cylinder to discharge passage 71.

The valve 78 is fixed to a shaft 81 by a pin 82 (Figs. 5 and 8). This shaft is mounted to turn in valve body 68 and extends forwardly therethrough,—a suitable stuffing box being provided, as indicated in Fig. 5, to insure against escape of liquid. The forward end of shaft 81 is squared (see also Fig. 6) and such end is received in a valve actuating lever 83. The rear end of shaft 81 has a flange 84 which is drawn tightly against the rear face of valve 78 before pin 82 is applied. The valve is covered by a cup-like housing 85 which encompasses and closely fits the peripheral rim of the valve seat as shown in Fig. 5 and which is secured to the valve body by bolts 86. A screw 87, threaded into housing 86 and held in adjusted position by a lock nut 88, has an inner hemispherical end which bears on the flange 84 of shaft 81 and serves to press the valve 78 against its seat. This screw is located in a recess in housing 85 and is normally covered and concealed by a removable cap 89.

Liquid, such as gasoline, is supplied under pressure to the inlet passage 70 of the above described valve by any suitable means. As herein shown, the liquid is drawn up through a pipe 90 (Figs. 3 and 4), adapted for connection to an underground supply tank, by a pump 91 and forced by the latter through a pipe 92 into a tank 93. Liquid from the bottom of this tank is forced through a pipe 94 into a passage 95 formed in a casting 96, which is bolted to the lower end of the valve body 68. As shown in Figs. 3 and 5, passage 95 registers with inlet passage 70.

The pump 91 is supported on a frame 97, secured as indicated in Figs. 3 and 4 to the three pipe columns 24. Upstanding from frame 97 are pairs of oppositely disposed lugs 98, in each of which is a clamping screw 99, and the pump has a depending part 100, which is located between the pairs of lugs 98 and is clamped in place by the screws 99. The pump, in this case, is manually operated by a lever 101, which is accessible when door 32 is opened. This lever is pivoted at 102 to a hub 103 which is fixed to the oscillatory operating shaft 104 of the pump. The pivotal connection 102 enables lever 101 to be swung from the position shown by dotted lines in Fig. 4, in which it lies entirely within casing 26, to the position shown by full lines, in which the lever extends in part outside the casing and in position to enable it to be swung back and forth (in a plane at right angles to that in which it swings on pivot 102) to operate the pump. Interposed in the suction pipe 90 is a suitable filter 105. A pipe 106 connects the suction pipe 90 and discharge pipe 92 and affords a by-pass around pump 91. Interposed in this by-pass is a pressure relief valve 107, which normally closes the same but opens whenever the pressure of the pumped liquid exceeds the normal range of operating pressures. For example, should pump 91 be operated while the valve (not shown) on the end of dispensing hose 35 is closed, the valve 107 will open and by pass the liquid,—avoiding breakage of the glass cylinders 20.

The tank 93 is intended to rid the gasoline from air before it reaches the measuring cylinders. For example, if there is a small leak in the suction pipe 90 air will enter and mix with the gasoline. To insure that the gasoline delivered to cylinders 20 is free from air bubbles the separator 93 is used. The pipe 92 extends nearly to the top of tank 93 and terminates with a closed upper end. In the periphery of pipe 92, near such end, are a series of radial openings 108 from which the gasoline issues in horizontal jets, thereby breaking up the flow, the better to enable the air to escape. A pipe 109 leads from the top of tank 93 upwardly to approximately the level of the lower ends of cylinders 20 (see Fig. 5) where it is connected to a siphon breaker or air admission valve 110. A pipe 111 leads from the latter downwardly and is adapted for connection to the underground supply tank. The air and, of course, some liquid passes out through pipes 109 and 111 and is carried off to the underground supply tank while liquid which is free from air is taken from the bottom of tank 93 by pipe 94. The tank 93, which always remains full of liquid, has a capacity in excess of that of one of the measuring cylinders, wherefore a supply of gasoline free from air is available immediately on operation of the pump.

The arrangement just described also affords an automatic drain for the measuring cylinders or rather that particular cylinder which is in the process of being filled. Should pumping cease during the operation of filling such measuring cylinder, the liquid therein will immediately drain back to tank 93 from which it passes by way of pipes 109 and 111 back to the supply tank. The system will drain to the level of the siphon breaker 110 or just slightly below the bottom of the glass cylinders 20. Thus, it is insured that these glass cylinders are drained and this without requiring any attention on the part of the operator. Whichever cylinder 20 is being filled will drain as described and the other cylinder will, of course, drain through the discharge passage 71 to the level of weir 71' which is located in the same plane as the bottoms of cylinders 20. This feature of the invention is equally useful whether or not the measuring receptacles 20 are true cylinders as shown and whether or not these receptacles contain pistons for operating valve 78. Some means, other than these pistons, may be used for operating valve 78 according to this feature of the invention.

It will be evident that as liquid under pressure enters one cylinder, say the left hand one in Fig. 3, the piston therein will be raised. The two pistons are interconnected so that the raising movement of either will effect a lowering movement of the other and secure a more rapid discharge of liquid than could be obtained by gravity flow alone. Also, the valve 78 is operated by means controlled by the position of the pistons, as will later be described in detail, so that the valve is reversed in position whenever a piston abutment 65 engages the fixed abutment 48. When a piston is at the top of its stroke, its cylinder contains, between the lower face of the piston and the upper face of member 21, some definite measured volume as for example, one gallon or five liters. Theoretically, the stroke of both pistons should be equal but as a practical matter these glass cylinders are seldom exactly uniform and it is necessary to provide means, such as the stop screws 48, that enable the stroke of one piston to vary from that of the other. It is also necessary to incorporate in the connections between the two piston rods, provisions that will permit the strokes of different lengths.

Each piston rod 63 extends downwardly through a suitable stuffing box, as indicated in Fig. 3, into the casing 29. The lower ends of these rods enter into guiding tubes 112, which are fixed to laterally projecting arms 113 on frame 96 and depend from such arms into casing 26, where they terminate with closed lower ends. Since these rods must of necessity extend into casing 26, the interior of which is accessible when door 32 is opened to operate the pump, they are encased in tubes, to prevent access thereto and possible improper manipulation thereof. For similar reasons, a horizontal partition plate 114 (Figs. 3 and 4) is secured to arms 113 to make it difficult to reach up into casing 29 through the door opening and gain access to other parts to be described which are connected to the piston rods. This plate 114 is provided with a semi-cylindrical pocket 115 for a purpose which will later appear.

Fixed to each piston rod is a member having a forwardly projecting lug 116 and a rearwardly extending lug 117 (Fig. 5). From lug 116, there extends, in a direction forwardly and inwardly, a third lug 118, hereinafter referred to as a latch releasing means. The rear lug 117 is slidably engaged with a stationary guide rod 119 suitably secured at its lower end to an arm 113 and at its upper end to base member 21. Mounted to slide in lug 116 in a direction parallel to the axis of the piston rod is a rod 120 having a head 121 on its lower end adapted to abut the lower face of lug 116. Threaded, and therefore adjustable, on the upper end of rod 120 is a nut 122 and interposed between nut 122 and the upper face of lug 116 is a spring 123. Loosely encompassing spring 123 and resting on the upper face of lug 116 is a sleeve 124, which serves to limit the degree of compression of spring 123 by abutment with nut 122.

The head 121 of the rod 120, associated with one piston rod 63, is connected to the head 121 of the rod 120, associated with the other piston rod, by a flexible member, such as a sprocket chain 125, which is guided by a pair of grooved rollers 126. These rollers are mounted in the forked outer ends of a rocker arm 127, pivoted centrally upon a stud 128 secured to frame 96. Each roller turns on a bolt 129, the ends of which are mounted in slots 130 in the rocker arm, whereby each roller is independently and radially adjustable. The rocker arm 127 is limited in its rocking movement by abutment with the projecting ends of one or the other of a pair of bolts 131 which serve to secure the partition plate 114 to member 113. The rocker is shown at one of its extreme positions in Fig. 6.

In my prior application, somewhat similar mechanism was used to interconnect the two piston rods but the rollers for the sprocket chain were fixed instead of being carried by a rocker arm. Also a relatively large degree of compression of the springs, corresponding to springs 123, was permitted (there were no sleeves corresponding to sleeves 124) and these springs were relied upon to compensate for inequalities in the strokes of the two pistons as well as to give an initial downward kick to the pistons at the start of their discharge strokes. The present arrangement is an improvement on the former and is designed to secure all of the advantages thereof but in a somewhat different manner and in a manner calculated to eliminate a certain disadvantage of the former arrangement. While the former arrangement was satisfactory under all ordinary operating conditions, yet it could be made to function improperly. By choking down the flow through the discharge hose, the springs 123, being relatively uncontrolled and unrestricted in their compressive action, would yield before the appointed time and under such conditions one piston could reach the end of its upward stroke before the other had completed its downward and discharge stroke. The result, of course, was that one cylinder would not empty as fast as the other filled. While this was not the normal operation but rather the operation under abnormally adverse conditions, nevertheless it is desired to overcome the described trouble and render the apparatus as fool-proof as possible.

To this end, the springs 123 are no longer relied on to compensate for differences in the strokes of the pistons but merely to give the initial downward kick to each piston. Should such initial kick not be desired, the springs may be omitted and the apparatus can be made, with certain adjustments, to function satisfactorily without them. A point to note is that the extent of compression of springs 123 is limited by sleeves 124 so that only a very small degree of relative movement between the pistons can be effected through yielding of the springs and nowhere near enough to permit the unusual operation above described. The compensation for differences in the lengths of the strokes of the pistons is now effected by the rocker arm 127, the rollers 126 of which may be adjusted radially in or out for this purpose. This arm functions during the initial part of the upward stroke of each piston. As one piston, say the right hand one, starts upwardly the rocker arm is swung counterclockwise until arrested by abutment with the left hand bolt 131. The chain 125 does not then move relatively to the rollers 126 and simply acts as linkage to connect the ends of the rocker arms to the two piston rods. Consequently, if the center of one roller 126, say the right hand one, is adjusted to lie at a greater distance from stud 128 than the other, the right hand piston rod will have a greater movement than the left hand piston rod. Thus, compensations for the stated purpose may be effected.

After the initial part of the upward stroke of one piston has been effected and the other piston pulled down as far as possible by the swinging of the rocker arm 127, the remainder of the downward stroke of the latter piston is effected by the chain 125, which then moves on its rollers 126 and relatively to the rocker arm. The arrangement is such that one piston completes its discharge stroke and abuts member 21 before the other quite reaches the end of its upward stroke. In Fig. 3, the right hand piston has been arrested by abutment with member 21 and the left hand piston has not quite completed its upward stroke. In Fig. 6, the parts occupy the relative positions which they should under such conditions. It will thus be seen that the left hand piston rod 63 is still travelling upward while the right hand piston rod has stopped. Therefore, the springs 123 will begin to compress and this action will continue until both sleeves 124 abut the overlying nuts 122. At such time, the left hand piston will have just reached the end of its upward stroke defined by the abutment of nut 65 and screw 48. The valve 78 will at this instant be actuated to reverse the connections of the cylinders 20 to passages 70 and 71 and the left hand cylinder will be permitted to discharge. The stressed springs 123 then relieve themselves and the result is a sharp spring impulse to start the left hand piston downwardly.

The valve 78 is operated with great rapidity by elastic means which are placed under stress by the movement of the piston rods but which are not released for action until a piston has reached the end of its upward stroke. The valve operating lever 83 swings between two stops 132 (Fig. 6) formed on a cross bar 133 secured to the valve body 68 by cap screws 134. Lever 83 is normally held stationary against one or the other of these stops 132 by one or the other of a pair of latches 135 adapted to engage the outer end of the lever, as shown in Fig. 6. Each latch 135 is pivoted at 136 to an upstanding lug on cross bar 133 and its outer end rests upon the head 137 of a rod 138 mounted to slide vertically in a bearing 139 on said cross bar. A spring 140 connects the latch to bearing 139 and tends to maintain the latch in the position shown in connection with the right hand latch in Fig. 6, in which head 137 abuts the upper end of bearing 139. The lower end of each rod 138 carries an adjustable abutment 141 adapted to be engaged by the underlying one of the pair of abutments 118, heretofore described as carried one by each piston rod 63. As shown in Fig. 6, the abutments 118 and 140 have already engaged and latch 135 has been partially moved but not quite enough to release lever 83. By adjustment of parts, the latch reaches release position at the same moment that a piston is arrested by abutment of members 65 and 48.

The elastic means for moving lever 83 from one to the other of its two positions consists of a spring 142 which is coiled around a rod 143. The latter at one end has a forked head 144 (Fig. 3) which is pivotally connected to a lever 145. The other end of rod 143 is slidable in an eye 146 swivelled to the valve lever 83. The spring acts between the eye 146 and head 144, tending to spread them apart. The lever 145 is mounted, at a point intermediate its ends, to turn on a stud 146' which projects forwardly from a hub 147 on a cross bar 148, secured to the valve body 68 by cap screws 149. The lower end of lever 145 has a slot 150 which receives a roll 151, mounted on the upper end of a lever 152. This lever 152 is fixed to the forward end of a shaft 153 (Fig. 5) which is mounted in a bracket 154, formed integrally with frame 96. The lower end of lever 152 is formed with two diverging arms 155 (Fig. 6) which are offset rearwardly (Fig. 5) so as to lie in the path of a hub 156 which projects forwardly from bracket 154. The lever 152 is limited in its swinging movement by the abutment of the arms 155 with hub 156 and, as shown in Fig. 6, the right hand arm 155 is held against the hub by the pressure of drive spring 142. The spring 142, as shown by full lines in Fig. 6, is completely stressed and in readiness to move lever 83 to the right as soon as latch 135 releases the latter. On release of the latch, the spring will expand and drive lever 83 rapidly to the right into the position shown by dotted lines. The lever 145 is held against movement by the spring due to the lever 152 and this in turn is held against movement by the abutment of one of the arms 155 with hub 156. The reaction of the spring on levers 145 and 152, during the driving of lever 83, is such as to tend to move lever 145 in a counterclockwise direction and lever 152 in a clockwise direction and such movement is resisted by the abutment of arm 155 with hub 156.

For the purpose of stressing spring 142 and positioning it so as to again act to drive lever 83 back from the dotted line to the full line position shown in Fig. 6, the following mechanism is employed. To the rear end of shaft 153 is fixed the hub 157 of a lever 158 (Fig. 5). This lever near each ends is offset rearwardly so that its ends lie in back of the piston rods 63 and each such end is connected by a link 159 to a piece 160, which loosely encompasses the adjacent piston rod. Below each slide piece 160 is a spring 161, which encompasses the piston rod and rests upon lug 116 in back of sleeve 124. Assuming that lever 83 and drive spring 142 occupy the position shown by dotted lines in Fig. 6, as the right hand piston rod 63 (Fig. 6) moves upwardly, the spring 161 thereon will eventually engage the overlying slide piece 160 and move it upwardly, thereby rocking lever 158 in a counterclockwise direction. Such movement of lever 158 will, through lever 152 move lever 145 in a clockwise direction, thereby compressing spring 142. The rod 143 slides in eye 146 to permit this action. The stressing of spring 142 by upward movement of the right hand piston rod continues until the left hand arm 155 of lever 152 engages hub 156. Thereafter, any additional movement of the piston rod, necessary to cause abutment 65 to engage stop screw 48, simply compresses spring 161. The latter does not yield, at least materially, up to the time when arm 155 engages hub 156.

The stop, provided by the engagement of the two last named elements, is necessary because the point of pivotal connection of lever 145 to rod 143 crosses the line of centers which connects stud 146′ to the center of oscillation of eye 146. This crossing of said line of centers occurs near the end of the operation of stressing spring 142 and as a result, the direction in which spring 142 acts on eye 146 is changed. The spring then tends to move valve lever 83 to the left but is restrained for the moment from so doing by the right hand latch 135. The spring also tends to move lever 145 still further in a clockwise direction but is restrained by the engagement of the left hand arm 155 with hub 156. As soon as the right hand latch 135 is released, spring 142 will expand and drive lever 83 with great rapidity back into its left hand position, in which it is immediately held by the left hand latch 135. On an ensuing upward movement of the left hand piston rod 63, the lever 158 will be rocked in a clockwise direction which will result in a counter-clockwise movement of lever 145 whereby spring 142 will be again stressed and, near the end of the stressing action, turned into the position illustrated by full lines so that it will tend to move valve lever 83 to the right.

The register 34 is arranged to indicate the number of unit measured quantities dispensed by counting the number of operations of the valve lever 83. This register is supported by one of the casing sections 29 as shown in Fig. 5. Three studs 162 projecting forwardly from the bracket 154, above described, abut this casing 29 and the latter is clamped thereto by cap screws 163. Fixed to the inner face of casing 29 is a frame 164 in which the register operating shaft 165 is mounted. This shaft has fixed to its inner end a ratchet 166. In back of the ratchet and arranged to swing freely in the space between the front end of shaft 153 and the rear end of shaft 165 is an approximately Y-shaped lever 167 (Fig. 6) which is pivoted on a stud 168 secured to hub 156. One of the two upwardly diverging arms of this Y-shaped lever carries a pawl 169 for actuating the ratchet 166. A holding pawl 170 is pivotally mounted on stud 168 and these pawls are interconnected by a coil spring 171, which lies in front of the ratchet (Fig. 5) and tends to hold both pawls in engagement therewith. The other of the aforesaid arms has a rearwardly projecting hub 172 which is connected by a link 173 to a fork 174. The latter is adjustably secured to a rod 175 which is mounted for vertical sliding movement in the hub 147, above described. The upper end of rod 175 underlies one or the other of a pair of cams 176, formed on the lower end of valve lever 83, and is held in engagement therewith by a spring 177 which connects a pin on said hub to link 173. The connection between rod 175 and fork 174 is such as to permit the effective length of these combined pieces to be increased or decreased. As the valve lever 83 swings from one to the other of its two extreme positions, one or the other of the cam faces 176, will depress rod 175 and thereby rock lever 167 in a counterclockwise direction. Such movement of this lever will cause pawl 169 to advance ratchet 166 by one step and turn shaft 165. The latter has a crank 178 on its outer end, the crank pin 179 of which engages the usual operating crank 180 of the register and crank 180 will, by the usual mechanism (not shown) of the register 34, cause an appropriate movement of the register hand 34′ (shown in Fig. 1). The ratchet is moved only during the first half of each movement of the lever 83 and, on the other half of such movement, rod 175 is permitted to rise under the influence of spring 177, which causes pawl 169 to move back into its original position,—the ratchet 166 being held against movement by pawl 170.

There is sometimes a demand for the liquid to be dispensed in quantities less than that dispensed by one of the cylinders 20 and to satisfy such demand, I provide an additional transparent measuring cylinder 181 (Fig. 13), which may for example hold one quart or one liter. This cylinder is located between and in front of the large cylinders. It is mounted on a base casting 182, which also serves as a valve body and is provided with a cap 183. In this cap is mounted a threaded plug 184 which by adjustment can depend into cylinder 181 to a greater or less extent to vary the volume of liquid contained therein. The cap 183 has a vent valve 185, which permits air to leave the cylinder during filling of the same; closes when the liquid fills the cylinder; and opens to vent the cylinder during discharge of its contents. The base 182 is adapted for attachment to the upstanding branch 186 of a special fitting 36' which is substituted for the fitting 36, heretofore described. This fitting has a passage 187 leading into the discharge passage 71. To apply the auxiliary cylinder 181, it is simply necessary to remove the usual fitting 36 and substitute the special fitting 36' shown,—also to provide piping 188, preferably having a check valve 189 to prevent return flow, from the supply pipe such as 94, to the base casting 182. The base 182 is secured by bolts 182'. (Fig. 15) to branch 186 and may be braced by a gusset plate 186' fixed to base 21 by the bolts 187' which serve to clamp fitting 36' to base 21.

Referring to Figs. 14 and 17, the casting 182 has a passage 190 leading downward from the base of cylinder 181 and terminating with a port 191 in the front circular face 192 of the casting on which is seated an oscillatory valve 193. Below port 191 and located one on each side thereof, are two other ports 194 and 195 leading into passages 196 and 197, which communicate respectively with discharge passage 187 and supply pipe 188. The valve 193 is simply a cylindrical block having in its inner face, which seats against face 192, a single recess 198 of sufficient extent to connect port 191 to either of the ports 194 or 195. In Fig. 18 the valve is so positioned that recess 198 connects the inlet port 195 to the cylinder port 191, whereby cylinder 181 may be filled by operation of pump 91. Of course, one of the measuring cylinders 20 would also be partly filled at the same time but not to an extent sufficient to operate valve 78. Therefore, when pumping ceases, such liquid as entered the cylinder 20 will drain back to the supply tank as heretofore described. After cylinder 181 has been filled, valve 193 is turned in a counter-clockwise direction into the position shown in Fig. 20, where recess 198 connects ports 191 and 194 and allows the contents of cylinder 181 to pass out to the discharge passage 71 and the dispensing hose 35. Thereafter, valve 193 is turned in a clockwise direction into the neutral position shown in Fig. 19 in which valve 193 blocks off the inlet and discharge ports 195 and 194, respectively.

The valve 193 is held in place by a cup shaped housing 199 secured by bolts 200 (two of which appear in Fig. 15). The operating shaft 201 for valve 193 is mounted in housing 199 (Fig. 14) and extends out of the same through the stuffing box shown. A spring 202, coiled around shaft 201 and located in a recess in housing 199, presses valve 193 against the face 192 of the valve body. Fixed at a point intermediate its ends to shaft 201 is an operating lever 203 the upper end of which is formed with an arcuate track 204, concentric with shaft 201 and having at each end a stop 205. A spring pressed pin 206, (Fig. 14) mounted in base 182, has a rounded lower end which engages track 204. When lever 203 is in neutral position (vertical) this pin 206 engages in a recess (Fig. 14) formed in the center of track 204, thereby yieldingly holding the lever in such position. When the lever is moved to the right or to the left of such position its movement is arrested by the abutment of one or the other of stops 205 with pin 206.

Registration of the quantities delivered from cylinder 181 is effected by a separate counter 207, of the ordinary cyclometer type. This counter is suitably secured as indicated to the back side of lever 203 and the latter has an opening 208 (Fig. 15) through which the face of the register is visible. The counter has the usual star wheel 209, which when turned in one direction will operate the counter. A cylindrical pin 210 lies in the path of the teeth of the star wheel. This pin is pivoted to a fork 211 formed on the lower part of housing 199 and can swing counter-clockwise, as viewed in Fig. 16, when star wheel 209 is bodily moved to the right by the movement of lever 203 into fill position. "Fill" position in Fig. 16 is reversed from "fill" position as shown in Fig. 18. No turning movement of the star wheel results when lever 203 is thus moved, for pin 210 is free to move. This pin is lifted by one of the teeth of the star wheel and after that tooth has passed, pin 210 drops back into a vertical position. The pin 210 cannot swing in a clockwise direction beyond said position. Consequently, when star wheel 209 is subsequently bodily moved to the left by the movement of lever 203 into discharge position, the star wheel will be turned one fifth of a revolution when one of its teeth engages pin 210. As lever 203 is moved back to neutral position no turning movement of the star wheel takes place. In order to avoid improper operation of valve 193, means are provided which force the operator to manipulate lever 203 in the following manner, viz., first—he must move it to fill position, movement in the reverse direction being prevented; second, he must move the lever completely to fill position before being able to move it to discharge position; third, the lever once started towards discharge position must be moved all the way to such position before it can be returned to neutral position.

These results are accomplished simply by a reversible pawl 212 which plays over a serrated segment 213. The segment is secured as shown in Fig. 16 to housing 199. The pawl 212 is pivotally connected to the upper end of lever 203 and is perforated to receive the outer end of a spring 214 which, at its other end, is secured to lever 203 as best shown in Fig. 14. This spring 214 in its unflexed form is straight and tends to hold pawl 212 with its point positioned vertically below its pivot. As shown in Fig. 16, movement of the upper part of lever 203 to the right is prevented by the pawl 212 while movement to the left, which will turn the valve to fill position, is permitted. It will be obvious that the pawl will prevent the said part of the lever from moving to the right until the lever has completed its movement in this direction. The movement of lever 203 is limited as described by pin 206. When the right hand stop 205 on lever 203 abuts the pin 206, pawl 212 will have moved off the left hand end of segment 213 and will have been swung back by spring 214 into a radial position with respect to the center of lever 203. Movement of lever 203 in a direction such as to carry the left hand stop 205 toward pin 206 will now be permitted but, once this movement is started, the pawl will prevent retrograde movement. This forces the operator to move the lever to discharge position and operate the counter 207 to the desired degree. As left hand stop 205 on lever 203 abuts the pin 206, pawl 212 rides off the right hand end of the segment and permits the lever to be moved back to neutral position.

The pocket 115, heretofore referred to, is adapted to receive the chain 125 when the pump is shipped. For the purposes of shipment, both pistons are moved into their lowermost positions, thus creating slack in the chain 125 which is received in the pocket 115.

The operation of the apparatus will now be described, assuming that the parts occupy the relative positions shown in Figs. 3 and 6. That is, the left hand cylinder 20 is filled with liquid to the level of its piston 54 and such piston has been moved almost to the upper end of its stroke. The other piston 54 is at the lower end of its cylinder and that cylinder has been emptied. Valve 78 now connects the left hand cylinder to supply pipe 70 and the right hand cylinder to discharge pipe 71. On continued actuation of pump 91, liquid will enter the left hand cylinder 20 and raise the piston therein until stop 65 abuts stop 48. This final raising movement of the left hand piston will compress both springs 123 until sleeves 124 abut nuts 122. Also, lug 118 will raise the left hand latch 135 releasing lever 83 at the instant piston 54 reaches the upper end of its stroke and the stressing of spring 123 has been completed. Lever 83 will be moved to the right by spring 142 and valve 78 turned to connect the left hand cylinder 20 to discharge passage 71 and the right hand cylinder to supply passage 70. The springs 123 then expand and impart a spring impulse to the left hand piston to initiate its downward stroke. Liquid now enters the right hand cylinder 20, raising its piston and causing the left hand piston to descend, thereby positively forcing the liquid out of the left hand cylinder and into passage 71. As the right hand piston travels upwardly, the spring 161 engages slide-piece 160 and raises the same, thereby rocking levers 158, 152 and 145 and causing the valve spring 142 to be compressed between members 144 and 146. When the left hand piston has completed its discharge stroke and come into abutment with member 21, the right hand piston will not have yet reached the end of its upstroke. Pumping being continued, the right hand piston is forced to rise until its abutment 65 engages the overlying abutment 48. Meanwhile, since the left hand piston cannot move further in a downward direction, the springs 123 are compressed. Near the end of the upstroke of the right hand piston, the left hand lug 118 engages the overlying abutment 141 and lifts the same far enough to release lever 83 from latch 135. This release occurs simultaneously with the engagement of the abutment 65 on the right hand piston with the overlying abutment 48. On release of lever 83, it is driven by the expansion of spring 142 into its left hand position and thereby valve 78 is moved to connect the right hand cylinder to discharge passage 71 and the left hand cylinder to supply passage 70. The right hand piston is then moved by the expansion of springs 123 and started on its discharge stroke as described and the left hand piston immediately starts upwardly and continues the downward movement of the right hand piston which was initiated by springs 123. There is no interruption in the downward movement of either piston but there is a noticeable sharp kick in the initial movement of each piston, due to the spring impulse which starts it rapidly in motion and imparts momentum to the column of liquid below it to accelerate the discharge. The left hand cylinder is filled and, at the end of the upstroke of the left hand piston, the valve 78 will be reversed in a manner similar to that described.

The described action continues as long as pumping continues, each cylinder alternately filling and discharging and each cylinder discharging while the other is filling and vice versa. The result is the delivery of a practically uninterrupted stream of liquid from the apparatus. Speedy delivery is obtained by reason of the use of pistons for forcibly discharging the cylinders, as distinguished from discharge by gravity flow alone. For example, from 12 to 14 gallons per minute can be dispensed with the apparatus and this speed is made possible through the automatic shifting of the valve and the arrangement, whereby liquid is forced out from one cylinder as rapidly as it is forced into the other cylinder. This offers a distinct improvement over the arrangement, wherein, the force for expelling liquid from one cylinder is transmitted from the rising liquid in the other cylinder by means of a column of air. The air compresses to a considerable extent and does not serve as efficiently for the purpose as does the described inelastic transmission. In addition, when the pistons are started on their discharge stroke with a spring impulse, as is preferred, this contributes materially to speedy discharge of the liquid, especially under unfavorable conditions as where the delivery hose is bent into a crook and forms a liquid trap.

Referring now to the stopping of the apparatus, except for the arrangement whereby each piston has a dwell at the end of its discharge stroke, it would be difficult for the operator to stop pumping so that the pistons would come to rest exactly at the end of such strokes. Therefore, the dwell arrangement has an advantage in that it enables the operator, without much trouble, to stop pumping at the proper time. That is, the operator can stop pumping at any time during the interval after the abutment of one piston with member 21 and before the abutment of the member 65 on the other piston with stop 48. This, however, is not necessary except to secure speedy delivery of the last gallon, because the arrangement is such as to permit the last gallon or, if desired, the last part of the last gallon to be delivered by gravity flow. Suppose, for example, that the customer has had nine of the desired ten gallons delivered from the apparatus when the parts are positioned as shown in Fig. 3, the operator can stop pumping at any time during the rising movement of the right hand piston, and the last gallon will drain from the left hand cylinder by gravity flow, due to the provision of the air vent in the piston. Generally speaking, the customer desires a slower delivery of the last gallon in order to avoid overflowing his tank which may then be nearly full. However, if speed is desired, the operator can readily gauge his pumping so that, in the example mentioned, the right hand piston will stop short of, but close to, the stop screw 48, thereby forcibly expelling all of the last gallon. The liquid pumped into the right hand cylinder in order to secure the speedy ejection of the last gallon, will drain back to the supply tank as above described.

From the foregoing, it will be seen that there will normally be some air in one of the cylinders beneath its piston. Such air is expelled through the valve-controlled vents in the piston, when the pump 91 is again operated. Assume for example, that the apparatus stopped with the parts positioned as in Fig. 3, the left hand cylinder will be drained of liquid and the space below its piston will become filled with air. The float 62 will have dropped to the base of the cylinder opening the three vents 60. When pumping is again commenced, the air will be rapidly driven out through these large vents because they are unobstructed by the float. The latter rises with the liquid as shown in Fig. 11, leaving the vents open until the liquid reaches the piston 54 and passes into the recess 59 and grooves 66. These vent valves function, for the most part, only during the first and last of a succession of cycles of operation. That is, they permit the air to be driven out of the cylinders on starting the pump and they vent the cylinders to permit drainage of the last gallon or part thereof. They may or may not function in intermediate cycles of operation according to whether the pistons dwell in their lower position or not. As illustrated, each piston dwells in its lower position and its vent valve will open so that all the liquid, including that in the grooves 66, the spaces between the coils of the spring 53 and that around float 62, is delivered. This arrangement is preferred, not only because it enables the spring impulse on the pistons, but because it tends toward the deliveries of uniform quantities of liquid from the cylinders under all conditions. That is, since one piston must drain at least in part by gravity flow, at the end of the last of a series of successive operations, it has been arranged to have each piston dwell during intermediate operations of the series. In this way, the vent valve 62 will open at the end of each downstroke of the piston whether the contents are forcibly expelled or pass out by gravity flow. The customer then gets all the liquid pumped into the cylinder including that in said grooves and spaces.

The apparatus is nevertheless workable in commercially satisfactory form even if the dwell of the pistons at the end of their discharge strokes is eliminated and with it the spring impulse, although both these features are important and preferred. By suitable adjustments, one piston may be made to reach its upper limit when the other reaches its lower limit and in such case there would be no dwell of either piston until pumping ceased. Then the vent valves 62 would not open at the end of any discharge stroke except the very last of the series. Consequently, the liquid in grooves 66 and the aforesaid spaces would not be delivered except with the last of the series of unit quantities dispensed. Therefore, there would under such conditions be a difference in measurement depending on whether liquid is forced out by the pistons or flows out by gravity. It is therefore important that the total volume of all the spaces in each piston, which are located above the level of the flat bottom face thereof and into which liquid can enter, be kept down to as low a figure as possible. If the grooves 66 were omitted, a reduction in said volume could be effected but there would then be a possibility of trapping some air below the piston and this might introduce an error which would more than offset that due to the small volume of these grooves. As hereinbefore set forth, the volume of these grooves is exceedingly small and the discrepancy which may under certain conditions occasionally be caused by them is not appreciable, being well within the tolerances permitted by the underwriters. Therefore, since the grooves have a real useful purpose in avoiding the trapping of air beneath the pistons and facilitating the expulsion of air from the cylinders, they are thought important and are preferably employed.

The invention has been disclosed herein, in an embodiment at present preferred, for illustrative purposes, but the scope of the invention is defined by the appended claims rather than by the foregoing description.

What I claim is:

1. In a liquid dispensing apparatus, a pair of measuring cylinders, a piston in each cylinder, a flexible member serving to interconnect the pistons, guiding devices to so direct said member that the pistons are forced to move in opposite directions, a rocker arm pivoted for swinging movement through a limited arc and on which said guiding devices are mounted one near each end thereof, means for supplying liquid alternately to one end of each cylinder and for discharging liquid from such end of one cylinder while the other is being filled, whereby one piston is moved by the liquid supplied to its cylinder under pressure and moves the other piston to force the liquid out of the other cylinder.

2. In a liquid dispensing apparatus, a pair of measuring cylinders, a piston in each cylinder, a flexible member serving to interconnect the pistons, guiding devices to so direct said member that the pistons are forced to move in opposite directions, a rocker arm pivotally supported at a point intermediate its ends for swinging movement through a limited arc and carrying said guiding devices one near each end thereof, said devices being mounted on said arm for radial adjustment the one independently of the other, means for supplying liquid alternately to one end of each cylinder and for discharging liquid from such end of one cylinder while the other is being filled, whereby one piston is moved by the liquid supplied to its cylinder under pressure and moves the other piston to force the liquid out of the other cylinder.

3. In a liquid dispensing apparatus, a pair of measuring cylinders, a piston in each cylinder, a flexible member serving to interconnect the pistons, guiding devices to so direct said member that the pistons are forced to move in opposite directions, a rocker arm pivotally supported at a point intermediate its ends for swinging movement through a limited arc with its ends moving in a general direction toward and away from said pistons, said guiding devices mounted one near each end of said arm for adjustment the one independently of the other in a general direction toward and away from the pivotal support of said arm, means for supplying liquid alternately to one end of each cylinder and for discharging liquid from such end of one cylinder while the other is being filled, whereby one piston is moved by the liquid supplied to its cylinder under pressure and moves the other piston to force the liquid out of the other cylinder.

4. In a liquid dispensing apparatus, a pair of measuring cylinders, a piston in each cylinder, a flexible member serving to interconnect the pistons, guiding devices to so direct said member that the pistons are forced to move in opposite directions, elastic means interposed in said flexible connection between the pistons, a rocker arm pivoted for swinging movement through a limited arc and on which said guiding devices are mounted one near each end thereof, means for supplying liquid alternately to one end of each cylinder and for discharging liquid from such end of one cylinder while the other is being filled, whereby one piston is moved by the liquid supplied to its cylinder under pressure and moves the other piston to force the liquid out of the other cylinder, and means for arresting each piston at the end of its discharge stroke before the other piston has reached the end of its filling stroke, whereby said elastic means is stressed near the end of the filling stroke of each piston and imparts an impulse to such piston to initiate its discharge stroke.

5. In a liquid dispensing apparatus, a pair of measuring cylinders, a piston in each cylinder, a flexible member serving to interconnect the pistons, guiding devices to so direct said member that the pistons are forced to move in opposite directions, elastic means interposed in said flexible connection between the pistons, a rocker arm pivotally supported at a point intermediate its ends for swinging movement through a limited arc and carrying said guiding devices one near each end thereof, said devices being mounted on said arm for radial adjustment the one independently of the other, means for supplying liquid alternately to one end of each cylinder and for discharging liquid from such end of one cylinder while the other is being filled, whereby one piston is moved by the liquid supplied to its cylinder under pressure and moves the other piston to force the liquid out of the other cylinder, and means for arresting each piston at the end of its discharge stroke before the other piston has reached the end of its filling stroke, whereby said elastic means is stressed near the end of the filling stroke of each piston and imparts an impulse to such piston to initiate its discharge stroke.

6. In a liquid dispensing apparatus, a pair of measuring cylinders, a piston in each cylinder, a flexible member serving to interconnect the pistons, guiding devices to so direct said member that the pistons are forced to move in opposite directions, elastic means interposed in said flexible connection between the pistons, a rocker arm pivotally supported at a point intermediate its ends for swinging movement through a limited arc with its ends moving in a general direction toward and away from said pistons, said guiding devices mounted one near each end of said arm for adjustment the one independently of the other in a general direction toward and away from the pivotal support of said arm, means for supplying liquid alternately to one end of each cylinder and for discharging liquid from such end of one cylinder while the other is being filled, whereby one piston is moved by the liquid supplied to its cylinder under pressure and moves the other piston to force the liquid out of the other cylinder, and means for arresting each piston at the end of its discharge stroke before the other piston has reached the end of its filling stroke, whereby said elastic means is stressed near the end of the filling stroke of each piston and imparts an impulse to such piston to initate its discharge stroke.

7. In a liquid dispensing apparatus, a pair of upstanding measuring cylinders disposed side by side, a piston in each cylinder having a piston rod depending through one end thereof, a flexible member, the ends of which are connected one to each piston rod; guiding devices directing said member to travel in a path in part substantially parallel and adjacent to one piston rod, in part across towards the other piston rod and then parallel and adjacent to the last named rod; a rocker arm pivoted for limited swinging movement and on which said guiding devices are mounted one near each end thereof, and means for alternately supplying liquid under pressure to the lower ends of said cylinders and for enabling one cylinder to discharge while the other is filling, whereby the liquid supplied to one cylinder raises the piston therein and through said rocker arm and flexible member lowers the other piston to forcibly expel the contents of the other cylinder.

8. In a liquid dispensing apparatus, a pair of upstanding measuring cylinders disposed side by side, a piston in each cylinder having a piston rod depending through one end thereof, a flexible member, the ends of which are connected one to each piston rod; guiding devices directing said member to travel in a path in part substantially parallel and adjacent to one piston rod, in part across towards the other piston rod and then parallel and adjacent to the last named rod; a rocker arm pivotally supported at a point intermediate its ends for swinging through a limited arc and carrying one near each end thereof said guiding devices, each of said devices being mounted on said arm for radial adjustment the one independently of the other, and means for alternately supplying liquid under pressure to the lower ends of said cylinders and for enabling one cylinder to discharge while the other is filling, whereby the liquid supplied to one cylinder raises the piston therein and through said rocker arm and flexible member lowers the other piston to forcibly expel the contents of the other cylinder.

9. In a liquid dispensing apparatus, a pair of upstanding measuring cylinders disposed side by side, a piston in each cylinder having a piston rod depending through one end thereof, a flexible member the ends of which are connected one to each piston rod; guiding devices directing said member to travel in a path in part substantially parallel and adjacent to one piston rod, in part across towards the other piston rod and then parallel and adjacent to the last named rod; a rocker arm pivotally supported at a point intermediate its ends for swinging movement through a limited arc with its ends moving in a general direction toward and away from said pistons, said guiding devices being mounted one near each end of said rocker arm for independent adjustment in a general direction toward and away from its pivotal support, and means for alternately supplying liquid under pressure to the lower ends of said cylinders and for enabling one cylinder to discharge while the other is filling, whereby the liquid supplied to one cylinder raises the piston therein and through said rocker arm and flexible member lowers the other piston to forcibly expel the contents of the other cylinder.

10. In a liquid dispensing apparatus, a pair of measuring cylinders, a piston in each cylinder, a piston rod for each piston having a lug thereon, means interconnecting said lugs and forcing the pistons to move in opposite directions, said means including a member slidable in one of said lugs in a direction parallel to the piston rod, abutments on said member on opposite sides of said lug, a spring interposed between one abutment and said lug and tending to hold the other abutment against the lug, and a sleeve encompassing said spring and resting on the lug in position to engage the first named abutment and limit the degree to which said spring can be stressed, means for supplying liquid alternately to one end of each cylinder and for discharging liquid from such end of one cylinder while the other is being filled, whereby one piston is moved by the liquid supplied to its cylinder under pressure and moves the other piston to force the liquid out of the other cylinder, and means for arresting each piston at the end of its discharge stroke before the other piston has reached the end of its filling stroke, whereby said spring is stressed near the end of the filling stroke of each piston and imparts an impulse to such piston to initiate its discharge stroke.

11. Liquid dispensing apparatus, comprising, a pair of upright measuring receptacles, a supply conduit, a discharge conduit, valve means for connecting the lower end of one of said cylinders to the supply conduit while the lower end of the other is connected to the discharge conduit, and movable to reverse such connections, a tank with the lower part of which said supply conduit communicates, a pump the inlet of which is adapted for connection to a source of liquid supply and the outlet of which delivers into said tank near the upper part thereof in a series of radial sprays an outlet pipe leading from said tank to said source, and means operable when one receptacle has been filled to a predetermined level to operate said valve and reverse said connections.

12. Liquid dispensing apparatus, comprising, a pair of upright measuring receptacles, a supply conduit, a discharge conduit, valve means for connecting the lower end of one of said cylinders to the supply conduit while the lower end of the other is connected to the discharge conduit, and movable to reverse such connections, a tank with the lower part of which said supply conduit communicates, a pump the inlet of which is adapted for connection to a source of liquid supply and the outlet of which delivers into said tank near the upper part thereof in a series of radial sprays, an outlet pipe leading from said tank upwardly to substantially the level of said receptacles and thence downwardly for connection to said source, a siphon breaker in the uppermost part of said outlet pipe, and means operable when one receptacle has been filled to a predetermined level to operate said valve means and reverse said connections.

13. A liquid dispensing apparatus, comprising, a pair of upright measuring cylinders, supporting means therefor including a hollow pedestal having a door, a piston in each cylinder having piston rods depending into said hollow pedestal, a partition in the latter above said door, guide tubes in which the lower ends of the piston rods slide and which depend below said partition and terminate with closed lower ends, pumping means accessible for operation through said door, a supply conduit leading from the pumping means, a discharge conduit, valve means for alternately connecting said cylinders to the supply and discharge conduits, means interconnecting said piston rods so that the rising movement of one causes a lowering movement of the other, and means operable by movement of said piston rods for operating said valve means.

14. In a liquid dispensing apparatus, a pair of measuring cylinders, a piston in each cylinder, means including a flexible member for interconnecting the pistons, guiding means to so direct said member that the pistons are forced to move in opposite directions, said guiding means including an oscillatable element and a pair of members for engaging said flexible member at spaced points, said members being independently adjustable toward and away from the center of oscillation of said element, means for supplying liquid alternately to one end of each cylinder and for discharging liquid from such end of one cylinder while the other is being filled, whereby one piston is moved by the liquid supplied to its cylinder under pressure and moves the other piston to force the liquid out of the other cylinder.

15. A liquid dispensing apparatus, comprising, a pair of upright measuring cylinders, a piston in each cylinder, a piston rod fixed to each piston and extending downwardly through the lower end of its cylinder, each piston having a plurality of passages therethrough and angularly spaced in a circular series around the piston rod, a float valve closely fitting but slidable on each piston rod and guided by the latter so that when the float valve rises with the liquid in its measuring cylinder its upper face will squarely engage the lower face of the piston and simultaneously close all said passages, means for alternately supplying liquid under pressure to the lower ends of said cylinders and for enabling one cylinder to discharge while the other is filling, and connections between the pistons whereby the rising piston forces the other downwardly to expel the contents of its cylinder.

16. A liquid dispensing apparatus, comprising, a pair of upright measuring cylinders, a piston in each cylinder having in its lower face a central and substantially cylindrical recess and having a plurality of passages through it opening into the upper wall of said recess, a piston rod secured to each piston and extending downwardly through the lower end of its measuring cylinder, each such cylinder end adapted to be engaged by the lower face of the piston therein at one end of the piston's stroke, a float valve slidably mounted on each piston rod and guided thereby so that when the valve rises with the liquid in its cylinder the upper face of the valve squarely engages said wall of said recess and simultaneously closes all said passages, each said float being free to move entirely out of its piston recess to permit unobstructed communication between said passages and the lower part of its cylinder and being of a size and shape to substantially fill its piston recess except that it is free to move downwardly far enough to open said passages when its piston abuts the lower end of its cylinder, means for alternately supplying liquid under pressure to the lower ends of said cylinders and for enabling one cylinder to discharge while the other is filling, and connections between the pistons whereby the rising piston forces the other downwardly to expel the contents of its cylinder.

In testimony whereof I have affixed my signature.

JOHN B. DAVIS.